US011218021B2

(12) United States Patent
Goto et al.

(10) Patent No.: US 11,218,021 B2
(45) Date of Patent: Jan. 4, 2022

(54) LOAD CONTROLLER

(71) Applicant: Panasonic Intellectual Property Management Co., Ltd., Osaka (JP)

(72) Inventors: Shusaku Goto, Kyoto (JP); Kengo Miyamoto, Osaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 0 days.

(21) Appl. No.: 16/689,394

(22) Filed: Nov. 20, 2019

(65) Prior Publication Data
US 2020/0177022 A1 Jun. 4, 2020

(30) Foreign Application Priority Data
Nov. 30, 2018 (JP) .............................. JP2018-226075

(51) Int. Cl.
H02J 9/06 (2006.01)
H02M 7/213 (2006.01)

(52) U.S. Cl.
CPC ............. H02J 9/062 (2013.01); H02M 7/213 (2013.01)

(58) Field of Classification Search
CPC ............ H02M 5/40; H02M 5/42; H02M 5/44; H02M 5/443; H02M 5/45; H02M 5/4505; H02M 5/451; H02M 5/452; H02M 5/458; H02M 5/4585; H02M 5/293; H02M 5/297; H02M 5/275; H02M 5/22; H02M 7/42;
(Continued)

(56) References Cited

U.S. PATENT DOCUMENTS 7,612,469 B2* 11/2009 Kuo .......................... H02J 9/06
307/80
2002/0118556 A1* 8/2002 Johnson, Jr. ........ H02M 5/4585
363/123
(Continued)

FOREIGN PATENT DOCUMENTS

EP 2782422 A1 9/2014
JP 4620773 B2 11/2010
(Continued)

OTHER PUBLICATIONS

Office Action for corresponding TW Patent Application No. 108143049 dated Oct. 8, 2020, with English language translation.
(Continued)

Primary Examiner — Bryan R Perez
(74) Attorney, Agent, or Firm — Renner, Otto, Boisselle & Sklar, LLP

(57) ABSTRACT

A load controller according to an embodiment includes a switching unit, a power source unit, and a control unit. The switching unit controls supply of power from an AC power supply to a load by selectively connecting or disconnecting the load to/from the AC power supply. The power source unit converts AC power supplied from the AC power supply into DC power. The control unit operates with the DC power supplied from the power source unit and controls the switching unit. The power source unit includes a constant-voltage source and a constant-current source. The constant-voltage source keeps a DC voltage to be output to the control unit a constant voltage. The constant-current source keeps a DC current to be supplied via the constant-voltage source to the control unit a constant current.

14 Claims, 3 Drawing Sheets

(58) Field of Classification Search
CPC ........ H02M 7/48; H02M 7/487; H02M 7/493; H02M 7/501; H02M 7/4826; H02M 7/49; H02M 7/4807; H02M 7/537; H02M 7/5387; H02M 7/533; H02M 7/53; H02M 7/53871; H02M 7/213
See application file for complete search history.

(56) References Cited

U.S. PATENT DOCUMENTS

| | | | |
|---|---|---|---|
| 2006/0255745 A1 | 11/2006 | DeJonge | |
| 2013/0128641 A1* | 5/2013 | Higashihama | H05B 45/37 363/126 |
| 2015/0061544 A1* | 3/2015 | Hamanaka | H02M 3/156 315/307 |
| 2015/0098708 A1* | 4/2015 | Kido | H04B 10/116 398/118 |
| 2017/0303351 A1 | 10/2017 | Daranyi et al. | |
| 2018/0034361 A1* | 2/2018 | Shizu | F24F 11/89 |

FOREIGN PATENT DOCUMENTS

| | | |
|---|---|---|
| JP | 2012-014953 A | 1/2012 |
| JP | 5222903 B2 | 3/2013 |
| TW | 201222184 A | 6/2012 |
| WO | 2014192246 A1 | 12/2014 |

OTHER PUBLICATIONS

Extended European Search Report for corresponding European Patent Application No. 19212556.5 dated Mar. 5, 2020.
Office Action for corresponding CN Patent Application No. 201911199690.7 dated Jul. 9, 2021, with an English translation.

\* cited by examiner

LOAD CONTROLLER

CROSS-REFERENCE TO RELATED APPLICATION

This application claims the benefit of foreign priority to Japanese Patent Application No. 2018-226075 filed on Nov. 30, 2018, the entire contents of which are hereby incorporated by reference.

TECHNICAL FIELD

The present disclosure generally relates to a load controller, and more particularly relates to a load controller for controlling the supply of power from an AC power supply to a load.

BACKGROUND ART

JP 2012-14953 A discloses a two-wire dimmer (corresponding to a load controller) for performing a lighting control on an LED light fixture (as a load). The two-wire dimmer includes: a triac for opening and closing a power line for supplying power from an AC power supply to the LED light fixture; a control unit for controlling the on/off states of the triac; and a power generator circuit for generating power for the control unit based on the AC power supplied from the AC power supply. The power generator circuit includes: a rectifier circuit for rectifying the AC voltage of the AC power supply; and a regulator circuit (constant-voltage source) for transforming a pulsating voltage rectified by the rectifier circuit into a predetermined DC voltage. This two-wire dimmer is designed to perform a lighting control on the LED light fixture with the quantity of power supplied from the AC power supply to the LED light fixture adjusted by turning the triac on and off.

In the two-wire dimmer, when the amount of current consumed by a circuit (such as the control unit) for controlling the LED light fixture varies while the LED light fixture is in off state with the triac turned off, the variation may cause a current to flow through the off-state LED light fixture to switch the light fixture on erroneously. In addition, when the amount of current consumed by a circuit (such as the control unit) for controlling the LED light fixture varies while the LED light fixture is in on state, the variation may cause the LED light fixture to cast flickering light (i.e., to have inconsistent luminance).

SUMMARY

The present disclosure provides a load controller with the ability to reduce the chances of a load operating erroneously due to such a variation in the amount of current consumed by a circuit for controlling the load.

A load controller according to an aspect of the present disclosure includes a switching unit, a power source unit, and a control unit. The switching unit is configured to control supply of power from an AC power supply to a load, and thereby turn the load on or off, by selectively connecting or disconnecting the load to/from the AC power supply. The power source unit is configured to convert the AC power supplied from the AC power supply into DC power. The control unit is configured to operate with the DC power supplied from the power source unit and control the switching unit. The power source unit includes a constant-voltage source and a constant-current source. The constant-voltage source is configured to keep a DC voltage to be output to the control unit a constant voltage. The constant-current source is configured to keep a DC current to be supplied via the constant-voltage source to the control unit a constant current.

DESCRIPTION OF EMBODIMENTS

Embodiments of a load controller according to the present disclosure will now be described. Note that the embodiments and their variations to be described below are only examples of the present disclosure and should not be construed as limiting. Rather, those embodiments and variations may be readily modified in various manners, depending on a design choice or any other factor, without departing from a true spirit and scope of the present disclosure.

First Embodiment

A load controller 1 according to a first exemplary embodiment will be described with reference to FIG. 1.

Figure 1:
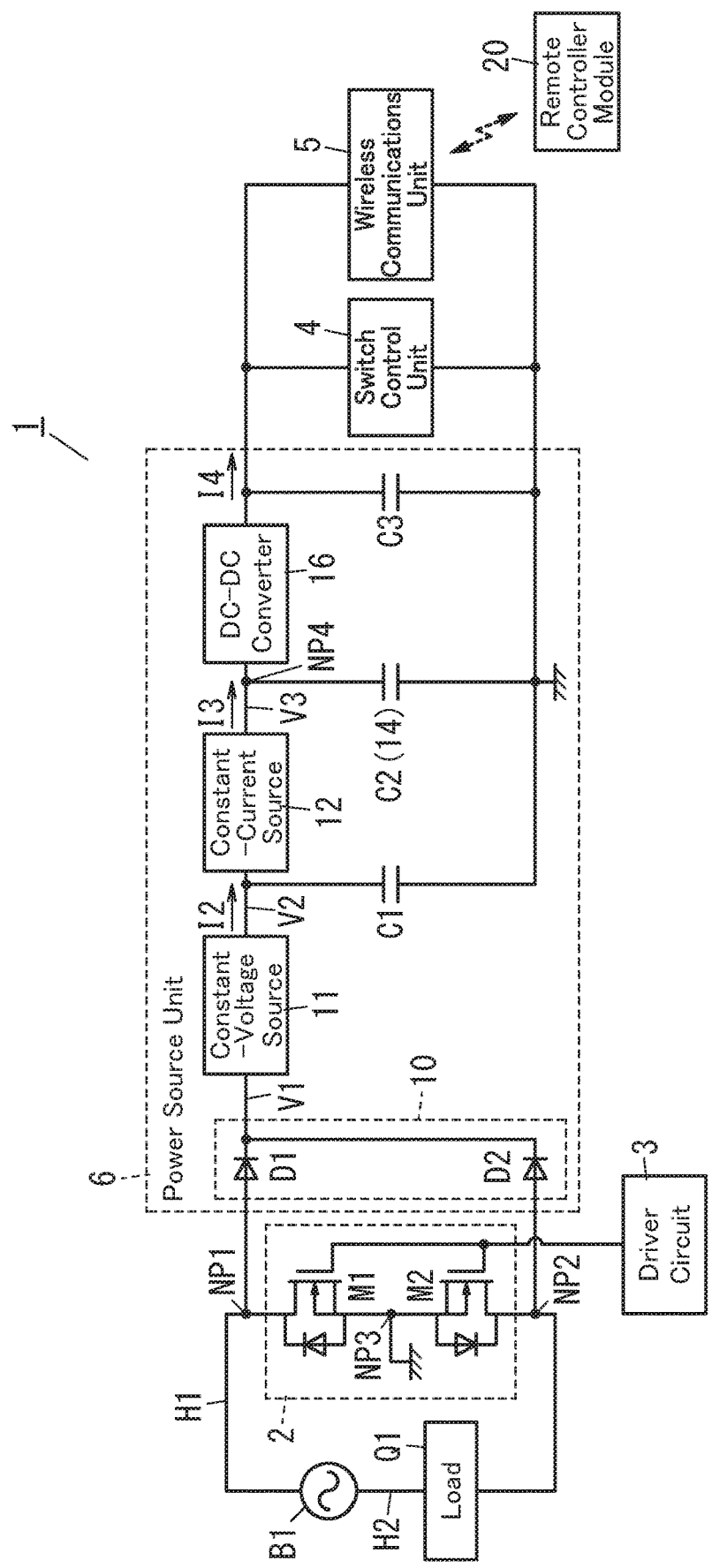
FIG. 1 is a block diagram schematically illustrating a configuration for a load controller according to a first exemplary embodiment.

As shown in FIG. 1, the load controller 1 may be implemented as, for example, a two-wire load controller. The load controller 1 is connected in series between an AC power supply B1 and a load Q1 to control the supply of power from the AC power supply B1 to the load Q1. The load controller 1 operates with the power supplied from the AC power supply B1. That is to say, the load Q1 and the load controller 1 both operate with the power supplied from the AC power supply B1.

The load controller 1 is controllable with, for example, a control signal transmitted wirelessly from a remote controller module 20. That is to say, controlling the load controller 1 by operating the remote controller module 20 allows the operation of the load Q1 to be controlled.

The load Q1 may be a light fixture, for example. The light fixture may be installed inside of a building to illuminate the indoor space of the building. The load Q1 has two power terminals, which receive the AC power from the AC power supply B1.

The AC power supply B1 may be an AC outlet, for example. The AC power supply B1 has two output terminals. One of the two output terminals of the AC power supply B1 is connected, through an electrical path H1, to one power terminal of the load Q1. The other output terminal is connected, through another electrical path H2, to the other power terminal of the load Q1.

The load controller 1 includes a switching unit 2, a driver circuit 3, a switch control unit 4 (control unit), a wireless communications unit 5 (additional functional unit), and a power source unit 6.

The switching unit 2 selectively connects or disconnects the load Q1 to/from the AC power supply B1, thereby controlling the supply of power from the AC power supply B1 to the load Q1 to turn the load Q1 on or off. As used herein, "to turn the load Q1 on" means lighting the load Q1 if the load Q1 is a light fixture, and "to turn the load Q1 off" means extinguishing the load Q1 if the load Q1 is a light fixture. The switching unit 2 is connected in series between the AC power supply B1 and the load Q1. That is to say, the switching unit 2 is connected in series to the electrical path H1.

The switching unit 2 includes two switching elements M1 and M2. Each of these two switching elements M1 and M2 may be implemented as a semiconductor switching element and more specifically implementable as an enhancement-mode N-channel metal-oxide semiconductor field effect transistor (MOSFET). The drain of one switching element M1 is electrically connected to one output terminal of the AC power supply B1. The drain of the other switching element M2 is electrically connected to the other output terminal of the AC power supply B1 via the load Q1. Furthermore, the respective sources of the two switching elements M1 and M2 are electrically connected together. The node NP3 where the respective sources of the switching elements M1 and M2 are connected together is connected to a ground node. The respective gates of the two switching elements M1 and M2 are electrically connected in common to the driver circuit 3. The driver circuit 3 turns the two switching elements M1 and M2 on and off under the control of the switch control unit 4.

The switching elements M1 and M2 are connected in series to the electrical path H1 to make the electrical path H1 either electrically conductive or electrically unconductive. One switching element M1 is in on state during each positive half cycle of the AC power supply B1, while the other switching element M2 is in on state during each negative half cycle of the AC power supply B1. That is to say, this load controller 1 performs phase control on the AC voltage to be supplied from the AC power supply B1 to the light fixture as the load Q1, and thereby turns on, or turns up or down, the light fixture, by turning the respective switching elements M1 and M2 on and off. For example, under the control of the switch control unit 4, each switching element M1, M2 turns on (i.e., becomes electrically conductive) at the beginning of each half cycle of the AC power supply B1 and turns off (i.e., becomes electrically unconductive) at a certain point in time during each half cycle according to the desired luminance of the load Q1. Alternatively, under the control of the switch control unit 4, each switching element M1, M2 may turn on (become electrically conductive) in any desired phase during each half cycle of the AC power supply B1 and may turn off (become electrically unconductive) at the end of that half cycle.

The driver circuit 3 drives the switching unit 2 under the control of the switch control unit 4. More specifically, the driver circuit 3 turns the two switching elements M1 and M2 on and off (i.e., makes the two switching elements M1 and M2 electrically conductive and unconductive) by applying a drive voltage to between the gate and source of each of the two switching elements M1 and M2 of the switching unit 2.

The wireless communications unit 5 communicates, using a wireless signal, with the remote controller module 20. The wireless communications unit 5 receives the wireless signal as a control signal from the remote controller module 20. Then, the wireless communications unit 5 outputs the control signal thus received to the switch control unit 4. Note that the wireless signal may be received as either an infrared ray or a radio wave.

The switch control unit 4 controls the on and off states of the switching unit 2 via the driver circuit 3 in response to the control signal from the wireless communications unit 5. This allows the load Q1 to be turned on, off, up, or down in a controlled manner.

More specifically, the switch control unit 4 controls the duration of the on period during each half cycle of the AC power supplied from the AC power supply B1. As used herein, the "on period" refers to a period that begins at a point in time when the switching unit 2 is turned on and ends at a point in time when the switching unit 2 is turned off. For example, the switch control unit 4 turns the switching unit 2 on at the beginning of each half cycle of the AC power supplied from the AC power supply B1 (i.e., at a zero crossing point of the AC power) and turns the switching unit 2 off at a desired point in time during the half cycle. That is to say, the switch control unit 4 controls the duration of the on period of the switching unit 2 by adjusting the timing to turn the switching unit 2 off. The load Q1 may be turned either off or on by setting the duration of the on period either at zero or any other non-zero value. In addition, the load Q1 may also be turned up or down (i.e., lighting control may be performed on the load Q1) by controlling the duration of the on period.

Optionally, the switch control unit 4 may control the duration of the on period by turning the switching unit 2 on at a desired point in time during each half cycle of the AC power supplied from the AC power supply B1 and by turning the switching unit 2 off at the end of that half cycle.

The power source unit 6 converts the AC power supplied from the AC power supply B1 into DC power and supplies the DC power thus obtained to the driver circuit 3, the switch control unit 4, and the wireless communications unit 5. In other words, the driver circuit 3, the switch control unit 4, and the wireless communications unit 5 operate with the AC power supplied from the AC power supply B1.

The power source unit 6 includes a rectifier circuit 10, a constant-voltage source 11, a constant-current source 12, a DC-DC converter 16 (step-down transformer), smoothing capacitors C1 and C3, and a buffer unit 14. The rectifier circuit 10 converts the AC power supplied from the AC power supply B1 into DC power. The rectifier circuit 10 includes two rectifying elements (rectifier diodes) D1 and D2. The respective anodes of these two rectifying elements D1 and D2 are connected to branch nodes NP1 and NP2, respectively, which are located on both sides of the switching unit 2 on the electrical path H1. The respective cathodes of the two rectifying elements D1 and D2 are connected together and connected to an input terminal of the constant-voltage source 11.

The rectifier circuit 10 receives, at the branch nodes NP1 and NP2, the AC power supplied from the AC power supply B1. More specifically, when the cycle of the AC power from the AC power supply B1 is a positive half cycle, the rectifier circuit 10 receives the AC power at the branch node NP1 and has the received AC power passed through, and rectified by, the rectifying element D1. On the other hand, when the cycle of the AC power from the AC power supply B1 is a negative half cycle, the rectifier circuit 10 receives the AC power at the branch node NP2 and has the received AC power passed through, and rectified by, the rectifying element D2. Then, the rectifier circuit 10 outputs a pulsating voltage, obtained by full-wave rectifying the AC voltage supplied from the AC power supply B1, to the constant-voltage source 11.

The constant-voltage source 11 transforms the pulsating voltage supplied from the rectifier circuit 10 into a constant DC voltage (e.g., a DC voltage of 80 V). That is to say, the constant-voltage source 11 keeps the DC voltage to be output to the switch control unit 4 and the wireless communications unit 5 a constant voltage. More specifically, the constant-voltage source 11 changes the voltage value of the output DC voltage V1 of the rectifier circuit 10 into a predetermined voltage value, and delivers an output voltage V2 with its voltage value maintained at the predetermined voltage value. The constant-voltage source 11 may be implemented as a combination of a Zener diode, a resistor, and a semiconductor switch, for example.

The smoothing capacitor C1 is provided to follow the constant-voltage source 11. More specifically, the smoothing capacitor C1 is connected between a branch node of the electrical path, connecting the output terminal of the constant-voltage source 11 to the input terminal of the constant-current source 12, and the ground node.

The constant-current source 12 controls the current I2 of the DC power supplied from (i.e., controlled by) the constant-voltage source 11 at a predetermined current value. That is to say, the constant-current source 12 keeps the DC current to be output to the switch control unit 4 and the wireless communications unit 5 a constant current. More specifically, the constant-current source 12 changes the current value of the output DC current I2 of the constant-voltage source 11 into a predetermined current value, and supplies an output current I3 with its current value maintained at the predetermined current value.

The constant-current source 12 switches, depending on whether the switching unit 2 is operating or not (i.e., depending on whether the load Q1 is on or off), the current value of the output current I2 of the constant-voltage source 11 from one predetermined current value to another, i.e., from a first current value (of 0.5 mA, for example) to a second current value (of 3.0 mA, for example), or vice versa. As used herein, the "operating" state of the switching unit 2 refers to a state where phase control is performed on the AC voltage supplied from the AC power supply B1 to the load Q1 by controlling the on/off states of the switching elements M1 and M2 to turn on (light) the load Q1. On the other hand, the "non-operating" state of the switching unit 2 refers herein to a state where the supply of power from the AC power supply B1 to the load Q1 is discontinued by turning the switching elements M1 and M2 off to turn off (extinguish) the load Q1. The second current value is larger than the first current value. More specifically, while the switching unit 2 is not operating (i.e., while the load Q1 is off), the constant-current source 12 changes the current value of the output current I2 of the constant-voltage source 11 into the first current value and supplies an output current I3 with its current value maintained at the first current value. On the other hand, while the switching unit 2 is operating (i.e., while the load Q1 is on), the constant-current source 12 changes the current value of the output current I2 of the constant-voltage source 11 into the second current value and supplies an output current I3 with its current value maintained at the second current value. The constant-current source 12 may be implemented as a combination of a semiconductor switch, a bias resistor, a shunt resistor, and a shunt regulator, for example.

The buffer unit 14 is provided to follow the constant-current source 12. More specifically, the buffer unit 14 is connected between a branch node NP4 of the electrical path connecting the output terminal of the constant-current source 12 to the input terminal of the DC-DC converter 16 and the ground node. The buffer unit 14 is implemented as a capacitor C2 for buffering. The buffer unit 14 is charged with the output voltage V3 of the constant-current source 12. That is to say, the buffer unit 14 stores, as a chargeable and dischargeable energy, the output current I3 of the constant-current source 12. If the output current I3 of the constant-current source 12 is short of a required level, then the buffer unit 14 is able to discharge the electric charges stored there as the output current I3 of the constant-current source 12. This compensates for the shortage of the output current I3 of the constant-current source 12.

The DC-DC converter 16 steps down the voltage value of the output DC voltage V3 of the constant-current source 12 to a predetermined voltage value (of 3.3 V, for example) and supplies the DC voltage thus stepped down to the switch control unit 4, the wireless communications unit 5, and the driver circuit 3. Note that the predetermined voltage value (of 3.3 V, for example) is only an exemplary voltage required by the switch control unit 4, the wireless communications unit 5, and the driver circuit 3.

The DC-DC converter 16 is followed by the smoothing capacitor C3. More specifically, the smoothing capacitor C3 is connected between the output terminal of the DC-DC converter 16 and the ground node.

In this load controller 1, the AC power is supplied from the AC power supply B1 to the power source unit 6. Next, the AC power supplied to the power source unit 6 is rectified, and converted into DC power, by the rectifier circuit 10. Then, the DC power thus obtained has its voltage value maintained at a predetermined voltage value (of 80 V, for example) by the constant-voltage source 11, has its current value maintained at a predetermined current value (which may be either the first current value or the second current value) by the constant-current source 12, and then has its voltage stepped down to a predetermined voltage value (of 3.3 V, for example) by the DC-DC converter 16. Then, the DC power that has had its voltage stepped down by the DC-DC converter 16 is supplied to the switch control unit 4, the wireless communications unit 5, and the driver circuit 3. In the meantime, the buffer unit 14 is charged with the output voltage V3 of the constant-current source 12. The electric charges stored in the buffer unit 14 are discharged as the output current I3 of the constant-current source 12 when the output current I3 of the constant-current source 12 is short of a required level.

In this embodiment, the first current value (i.e., the current value of the output current I3 of the constant-current source 12 when the load Q1 is in off state) may be set at 0.5 mA, for example. This current value is adopted on the premise that if the overall amount of current consumed by circuits for controlling the supply of power to the load Q1 (such as the switch control unit 4 and the wireless communications unit 5) is equal to or less than 0.7 mA, the load Q1 in off state will not turn on erroneously. Thus, the first current value is set at 0.5 mA with some margin allowed for that threshold current value of 0.7 mA.

In a situation where the first current value is 0.5 mA, if the output voltage of the constant-current source 12 is 50 V, then the output power of the constant-current source 12 is 25 mW (=0.5 mA×50 V). Also, if the DC-DC converter 16 has an efficiency of 80%, then the output power of the DC-DC converter 16 is 20 mW (=25 mW×80%). In that case, the overall amount of current to be consumed by the switch control unit 4 and the wireless communications unit 5 is approximately 6 mA. In such a situation, when the overall amount of current consumed by the switch control unit 4 and the wireless communications unit 5 exceeds 6 mA instantaneously, the electric charges stored in the buffer unit 14 are discharged to maintain the output current I3 of the constant-current source 12 at the first current value (of 0.5 mA).

Furthermore, in this embodiment, the second current value (i.e., the current value of the output current I3 of the constant-current source 12 when the load Q1 is on state) may be set at, for example, 5.0 mA, which is a relatively low current value. Thus, when the load Q1 is in on state, the impedance as viewed from the load Q1 decreases. Consequently, this allows, even when a significant overall amount of current consumed by the switch control unit 4 and the wireless communications unit 5 varies, the load Q1 to be kept on with good stability without causing flickers.

As can be seen from the foregoing description, the load controller 1 with the constant-current source 12 is able to keep the output current I4 of the power source unit 6 constant using the constant-current source 12. This reduces the negative impact of any variation in the overall amount of current consumed by circuits for controlling the load Q1 (such as the switch control unit 4 and the wireless communications unit 5) on the operation of the load Q1, thus reducing the chances of the variation in the overall amount of current consumed by the circuits for controlling the supply of power to the load Q1 causing the load 1 to operate erroneously.

In addition, the load controller 1 includes the buffer unit 14, and therefore, is able to compensate for any shortage of the output current I3 of the constant-current source 12 by the current discharged from the buffer unit 14.

Furthermore, the load controller 1 includes the wireless communications unit 5 as an additional functional unit. This reduces, even when the load controller 1 includes not only the switch control unit 4 but also the wireless communications unit 5, the negative impact of any variation in the amount of current consumed by the wireless communications unit 5 on the operation of the load Q1, thus reducing the chances of the variation in the amount of current consumed by the wireless communications unit 5 causing the load Q1 to operate erroneously.

As used herein, the "additional functional unit" refers to a processing unit behaving differently from the switch control unit 4 and operating with the DC power supplied from the power source unit 6. In the embodiment described above, the additional functional unit is the wireless communications unit 5. However, this is only an example and should not be construed as limiting. Alternatively, the additional functional unit may also be an operating panel allowing the user to enter an operating command for the load Q1. Still alternatively, the additional functional unit may also be a circuit for controlling the supply of power to the load Q1.

Variation of First Embodiment

In the first embodiment described above, the DC-DC converter 16 (step down transformer) is used as an exemplary step down circuit. Alternatively, the DC-DC converter 16 may also be replaced with a regulator (step down regulator) as an alternative step down circuit. Specifically, a step down linear regulator may be used as the regulator. When used, the regulator steps down the voltage value of the output DC voltage V3 of the constant-current source 12 to a predetermined voltage value (of 3.3 V, for example) and supplies the stepped down DC power to the switch control unit 4, the wireless communications unit 5, and the driver circuit 3.

Second Embodiment

Next, a second exemplary embodiment will be described. In the following description, any constituent element of this second embodiment, having the same function as a counterpart of the first embodiment described above, will be designated by the same reference numeral as that counterpart's, and a detailed description thereof will be omitted herein.

In the second embodiment, the constant-current source 12 is divided into two constant-current circuits 12A and 12B provided for the load Q1 in on state and the load Q1 in off state, respectively, and the buffer unit 14 is also divided into two sections provided for the load Q1 in on state and the load Q1 in off state, respectively. In addition, according to this second embodiment, the voltage value of the output voltage V2 of the constant-voltage source 11 is switchable from a voltage value for the load Q1 in on state to a voltage value for the load Q1 in off state, and vice versa. The second embodiment will be described in detail below.

Figure 2:
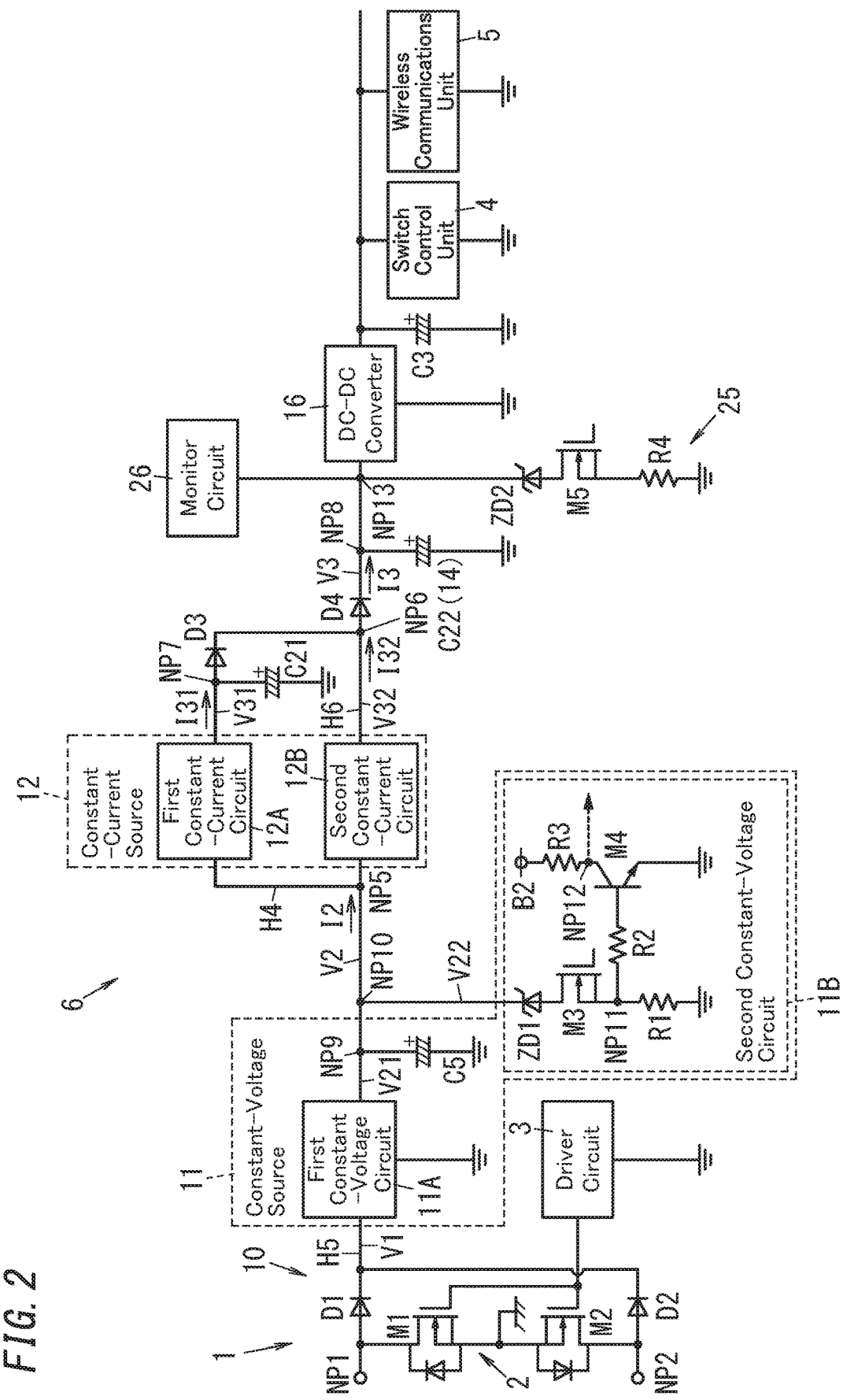
FIG. 2 is a block diagram schematically illustrating a configuration for a load controller according to a second exemplary embodiment.

As shown in FIG. 2, the power source unit 6 according to the second embodiment includes the constant-voltage source 11, the constant-current source 12, the buffer unit 14, rectifying elements D3 and D4, a discharge circuit 25, and a monitor circuit 26 (detector circuit).

The voltage value of the output voltage V2 of the constant-voltage source 11 is switchable, under the control of the switch control unit 4, from a first voltage value to a second voltage value, and vice versa. The first voltage value is a voltage value set for the load Q1 in off state, and is a relatively high voltage value, which may be 80 V, for example. The second voltage value is a voltage value set for the load Q1 in on state, and is a relatively low voltage value, which is lower than the first voltage value and may be 15 V, for example. The voltage value of the output voltage V2 of the constant-voltage source 11 is switched to the second voltage value when the load Q1 is on (i.e., when the switching unit 2 is operating), and is switched to the first voltage value when the load Q1 is off (i.e., when the switching unit 2 is not operating).

The constant-voltage source 11 includes a first constant-voltage circuit 11A, a second constant-voltage circuit 11B, and a capacitor C5.

The first constant-voltage circuit 11A changes the voltage value of the output voltage V1 of the rectifier circuit 10 into the first voltage value and delivers an output voltage V21 with its voltage value maintained at the first voltage value. An upper limit voltage value of the output voltage V21 of the first constant-voltage circuit 11A may be 80 V, for example. That is to say, if the output voltage V21 is greater than 80 V, then the voltage V21 output is regulated to 80 V. The first constant-voltage circuit 11A may be implemented as a linear power source, for example. The power source unit 6 has an electrical path H5. The electrical path H5 is connected between the output terminal of the rectifier circuit 10 and the input terminal of the DC-DC converter 16. The first constant-voltage circuit 11A is provided to follow the rectifier circuit 10 on the electrical path H5.

The capacitor C5 is provided to follow the first constant-voltage circuit 11A. The capacitor C5 is connected between a branch node NP9, following the first constant-voltage circuit 11A, and the ground node. The capacitor C5 is charged with the output voltage V21 of the first constant-voltage circuit 11A. That is to say, the capacitor C5 is charged with the output current of the first constant-voltage circuit 11A so as to readily discharge electric charges stored in the capacitor C5. The charge voltage of the capacitor C5 is delivered as the output voltage V21 of the constant-voltage source 11. When the voltage value of the output voltage V21 of the first constant-voltage circuit 11A is the first voltage value, the capacitor C5 is charged to the voltage with the first voltage value.

The second constant-voltage circuit 11B delivers an output voltage V22 with the second voltage value. More specifically, the second constant-voltage circuit 11B steps down the voltage value (first voltage value) of the output voltage V21 of the first constant-voltage circuit 11A to the second voltage value and delivers an output voltage V22 with its voltage value maintained at the second voltage value. The second constant-voltage circuit 11B is connected between a branch node NP10, following the capacitor C5, and the ground node.

The second constant-voltage circuit 11B includes a Zener diode ZD1, switching elements M3 and M4, resistors R1, R2, and R3, and a voltage source B2.

The Zener diode ZD1, the switching element M3, and the resistor R1 are arranged in this order from the branch node NP10 toward the ground node to form a series circuit. That is to say, the Zener diode ZD1, the switching element M3, and the resistor R1 are connected together in series between the branch node NP10 and the ground node. The voltage value of the Zener voltage of the Zener diode ZD1 is the second voltage value, which may be 15 V, for example. That is to say, the Zener voltage of the Zener diode ZD1 is the output voltage V22 of the second constant-voltage circuit 11B. The switching element M3 may be implemented as, for example, a semiconductor switch (such as an N-channel MOSFET (NMOS)). The control electrode of the switching element M3 is connected to the switch control unit 4. The switch control unit 4 controls the on and off states of the switching element M3 depending on whether the switching unit 2 is operating or not.

The resistor R3 and the switching element M4 are arranged in this order from the voltage source B2 toward the ground node to form a series circuit. That is to say, the resistor R3 and the switching element M4 are connected together in series between the voltage source B2 and the ground node. The switching element M4 may be implemented as, for example, a semiconductor switch (such as an npn bipolar transistor).

The resistor R2 is connected between a branch node NP11 and the control electrode of the switching element M4. The branch node NP11 is provided between the switching element M3 and the resistor R1. A branch node NP12 may be connected to, for example, either the switch control unit 4 or the monitor circuit 26. The branch node NP12 is provided between the resistor R3 and the switching element M4. Either the switch control unit 4 or the monitor circuit 26 detects the voltage at the branch node NP12 (i.e., the charge voltage of a second capacitor C22 to be described later).

This constant-voltage source 11 operates in the following manner. When the load Q1 is in off state (i.e., when the switching unit 2 is not operating), the switch control unit 4 controls the switching element M3 to off state, thus deactivating the second constant-voltage circuit 11B. This allows the capacitor C5 to be charged with the output voltage V21 of the first constant-voltage circuit 11A until its charge voltage reaches the first voltage value, which may be 80 V, for example. Then, the charge voltage of the capacitor C5 (with the first voltage value) is delivered as the output voltage V2 of the constant-voltage source 11 to the constant-current source 12. That is to say, the output voltage V21 (with the first voltage value) of the first constant-voltage circuit 11A is delivered as the output voltage V2 of the constant-voltage source 11 to the constant-current source 12.

On the other hand, when the load Q1 is in on state (i.e., when the switching unit 2 is operating), the switch control unit 4 controls the switching element M3 to on state, thus activating the second constant-voltage circuit 11B. This allows the electric charges stored in the capacitor C5 to be discharged to the ground node via the Zener diode ZD1, the switching element M3, and the resistor R1. As a result, the charge voltage of the capacitor C5 is lowered to, and maintained at, the voltage value of the Zener voltage of the Zener diode ZD1 (i.e., the second voltage value which may be 15 V, for example). Then, the charge voltage (with the second voltage value) is delivered as the output voltage V2 of the constant-voltage source 11 to the constant-current source 12. That is to say, the output voltage V22 (with the second voltage value) of the second constant-voltage circuit 11B is delivered as the output voltage V2 of the constant-voltage source 11 to the constant-current source 12.

Furthermore, controlling the switching element M3 to on state as described above turns the switching element M4 on. This causes a current to flow from the voltage source B2 toward the ground node via the resistor R3 and the switching element M4. As a result, the voltage at the branch node NP12 comes to have a certain voltage value, which is then output to either the switch control unit 4 or the monitor circuit 26. On receiving this certain voltage value, the switch control unit 4 or the monitor circuit 26 is notified that the output voltage V2 of the constant-voltage source 11 has switched from the first voltage value to the second voltage value.

The constant-current source 12 includes the first constant-current circuit 12A and the second constant-current circuit 12B. The buffer unit 14 includes a first capacitor C21 and a second capacitor C22 for buffering The first constant-current circuit 12A is provided for the load Q1 in on state (i.e., provided for the lower voltage). The first constant-current circuit 12A changes the current value of the output current I2 of the constant-voltage source 11 into a first current value (which may fall within the range from 2 mA to 3 mA, for example, and is supposed to be 2.5 mA in the following description) and supplies an output current I31 with its current value maintained at the first current value. An upper limit value of the output voltage V31 of the first constant-current circuit 12A is a first clamping voltage value, which may be 30 V, for example. That is to say, if the voltage value of the input voltage V2 is equal to or less than the first clamping voltage value, the first constant-current circuit 12A delivers an output voltage V31 corresponding to the output current I31. On the other hand, if the voltage value of the input voltage V2 is higher than the first clamping voltage value to make the voltage value of the output voltage V31 greater than the first clamping voltage value, then the first constant-current circuit 12A regulates the voltage value of the output voltage V31 to the first clamping voltage value. The first constant-current circuit 12A may be implemented as a linear power source, for example, but may also be implemented as a series power source.

The second constant-current circuit 12B is provided for the load Q1 in off state (i.e., provided for the higher voltage). The second constant-current circuit 12B changes the current value of the output current I2 of the constant-voltage source 11 into a second current value (which may be 0.5 mA, for example) and supplies an output current I32 with its current value maintained at the second current value. An upper limit value of the output voltage V32 of the second constant-current circuit 12B is a second clamping voltage value, which may be 55 V, for example. That is to say, if the voltage value of the input voltage V2 is equal to or less than the second clamping voltage value, the second constant-current circuit 12B delivers an output voltage V32 corresponding to the output current I32. On the other hand, if the voltage value of the input voltage V2 is higher than the second clamping voltage value to make the voltage value of the output voltage V32 greater than the second clamping voltage value, then the second constant-current circuit 12B regulates the voltage value of the output voltage V32 to the second clamping voltage value. The second constant-current circuit 12B may be implemented as a linear power source, for example, but may also be implemented as a series power source.

The first constant-current circuit 12A and the second constant-current circuit 12B are connected in parallel with each other. More specifically, the power source unit 6 further has an electrical path H4. The electrical path H4 is connected between branch nodes NP5 and NP6 so as to be parallel with an electrical path H6. The electrical path H6 is a part, located between the branch nodes NP5 and NP6, of the electrical path H5. The first constant-current circuit 12A is provided on the electrical path H4, and the second constant-current circuit 12B is provided on the electrical path H6.

The first capacitor C21 is charged with the output voltage V31 of the first constant-current circuit 12A. That is to say, the first capacitor C21 is charged with the output current I31 of the first constant-current circuit 12A so as to readily discharge electric charges stored in the first capacitor C21. The first capacitor C21 is provided to follow the first constant-current circuit 12A. More specifically, the first capacitor C21 is connected between a branch node NP7 of the electrical path H4 and the ground node. The branch node NP7 is provided between the output terminal of the first constant-current circuit 12A on the electrical path H4 and the branch node NP6.

The second capacitor C22 is charged with the output voltage V32 of the second constant-current circuit 12B. That is to say, the second capacitor C22 is charged with the output current I32 of the second constant-current circuit 12B so as to readily discharge electric charges stored in the second capacitor C22. The second capacitor C22 is provided to follow the second constant-current circuit 12B. More specifically, the second capacitor C22 is connected between a branch node NP8 of the electrical path H5 and the ground node. The branch node NP8 is provided, on the electrical path H5, between the branch node NP6 and the input terminal of the DC-DC converter 16.

The first capacitor C21 is a capacitor with the lower breakdown voltage (which may be 15 V, for example) and the larger capacitance (which may be 470 µF, for example). The second capacitor C22 is a capacitor with the higher breakdown voltage (which may be 60 V, for example) and the smaller capacitance (which may be 10 µF, for example). In other words, the breakdown voltage of the first capacitor C21 is lower than that of the second capacitor C22, and the capacitance of the first capacitor C21 is larger than that of the second capacitor C22.

The rectifying element D3 is provided to follow the first constant-current circuit 12A in the forward direction. More specifically, the rectifying element D3 is connected between the branch nodes NP6 and NP7 on the electrical path H4 and forward-biased. The rectifying element D4 is provided to follow the second constant-current circuit 12B in the forward direction. More specifically, the rectifying element D4 is connected between the branch nodes NP6 and NP8 on the electrical path H4 and forward-biased.

Next, it will be described how this constant-current source 12 operates. When the voltage value of the output voltage V2 of the constant-voltage source 11 is the first voltage value (which may be 80 V, for example) (i.e., when the switching unit 2 is not operating and when the load Q1 is in off state), the current value of the output current I31 of the first constant-current circuit 12A is maintained at the first current value (which may be 2.5 mA, for example. Meanwhile, the output voltage V31 of the first constant-current circuit 12A is regulated to the first clamping voltage value (which may be 30 V, for example). The current value of the output current I32 of the second constant-current circuit 12B is maintained at the second current value (which may be 0.5 mA, for example). Meanwhile, the output voltage V32 of the second constant-current circuit 12B is regulated to the second clamping voltage value (which may be 55 V, for example). In that case, the output voltage V31 of the first constant-current circuit 12A (i.e., the first clamping voltage value) is lower than the output voltage V32 of the second constant-current circuit 12B (i.e., the second clamping voltage value), thus making the rectifying element D3 electrically unconductive. As a result, the current I31 is not output from the first constant-current circuit 12A and the current I32 (with the second current value) is selectively output from the second constant-current circuit 12B. That is to say, a current flows selectively through the second constant-current circuit 12B, out of the first constant-current circuit 12A and the second constant-current circuit 12B. Thus, in that case, the output current I32 of the second constant-current circuit 12B (with the second current value which may be 0.5 mA, for example) is provided as the output current I3 of the constant-current source 12. Also, in that case, the first capacitor C21 with the lower breakdown voltage is not charged and the second capacitor C22 with the higher breakdown voltage is selectively charged with the output voltage V32 (relatively high voltage) of the second constant-current circuit 12B. The electric charges stored in the second capacitor C22 are discharged as the output current I3 of the constant-current source 12 when the output current of the constant-current source 12 is short of a required level.

As can be seen, when the voltage value of the output voltage V2 of the constant-voltage source 11 is the first voltage value (i.e., relatively high voltage value) (i.e., when the switching unit 2 is not operating), the first capacitor C21 with the lower breakdown voltage is not charged. In that case, the second capacitor C22 with the higher breakdown voltage is selectively charged with the relatively high voltage V32.

On the other hand, when the voltage value of the output voltage V2 of the constant-voltage source 11 is the second voltage value (which may be 15 V, for example) (i.e., when the switching unit 2 is operating and the load Q1 is in on state), the current value of the output current I31 of the first constant-current circuit 12A is maintained at the first current value (which may be 2.5 mA, for example), and the output voltage V31 of the first constant-current circuit 12A is controlled at a voltage value corresponding to the first current value. Meanwhile, the current value of the output current I32 of the second constant-current circuit 12B is maintained at the second current value (which may be 0.5 mA, for example), and the output voltage V32 of the second constant-current circuit 12B is controlled at a voltage value corresponding to the second current value. In that case, the output current I31 (with the first current value of 2.5 mA, for example) of the first constant-current circuit 12A is larger than the output current I32 (with the second current value of 0.5 mA, for example) of the second constant-current circuit 12B. Thus, the output voltage V31 of the first constant-current circuit 12A becomes higher than the output voltage V32 of the second constant-current circuit 12B, thus making the rectifying element D3 electrically conductive. As a result, the current I31 with the first current value (which may be 0.5 mA, for example) is output from the first constant-current circuit 12A, and the current I32 with the second current value (which may be 2.5 mA, for example) is output from the second constant-current circuit 12B. That is to say, a current flows through both of the first constant-current circuit 12A and the second constant-current circuit 12B. Therefore, in this case, a current, of which the amount (which may be 3.0 mA, for example) is the sum of the output current I31 of the first constant-current circuit 12A (i.e., a current with the first current value) and the output current I32 of the second constant-current circuit 12B (i.e., a current with the second current value), is supplied as the output current I3 of the constant-current source 12. Also, in this case, the first capacitor C21 with the lower breakdown voltage is charged with the output voltage V31 (i.e., a relatively low voltage) of the first constant-current circuit 12A, and the second capacitor C22 with the higher breakdown voltage is charged with the output voltage V32 (i.e., a relatively low voltage) of the second constant-current circuit 12B. The electric charges stored in the first capacitor C21 and the electric charges stored in the second capacitor C22 are discharged as the output current I3 of the constant-current source 12 when the output current I3 of the constant-current source 12 is short of a required level.

As can be seen, when the voltage value of the output voltage V2 of the constant-voltage source 11 is the second voltage value (i.e., the relatively low voltage value) (i.e., when the switching unit 2 is operating), the first capacitor C21 with the lower breakdown voltage and the second capacitor C22 with the higher breakdown voltage are both charged with relatively low voltages V31 and V32, respectively.

The discharge circuit 25 is configured to discharge the electric charges stored in the second capacitor C22 when the charge voltage of the second capacitor C22 exceeds a first charge voltage (threshold voltage). The first charge voltage may be, for example, a voltage equal to or lower than, and close to, the output voltage V3 of the constant-current source 12. In this embodiment, the monitor circuit 26 detects the voltage at a branch node NP13 (i.e., the charge voltage of the second capacitor C22) and outputs the result of detection to the switch control unit 4. Then, the switch control unit 4 controls the discharge of the discharge circuit 25 based on the result of detection by the monitor circuit 26.

The discharge circuit 25 is provided to follow (i.e., downstream of) the second capacitor C22. More specifically, the discharge circuit 25 is connected between the branch node NP13 on the electrical path H5 and the ground node. The branch node NP13 is provided between the branch node NP8 and the input terminal of the DC-DC converter 16 (i.e., to follow the second capacitor C22).

The discharge circuit 25 includes a Zener diode ZD2, a switching element M5, and a resistor R4.

The Zener diode ZD2, the switching element M5, and the resistor R4 are arranged in this order from the branch node NP13 toward the ground node to form a series circuit. That is to say, the Zener diode ZD2, the switching element M5, and the resistor R4 are connected together in series between the branch node NP13 and the ground node. The Zener voltage of the Zener diode ZD2 is set at the same voltage as the second charge voltage. The second charge voltage is lower than the first charge voltage. The switching element M5 may be implemented as, for example, a semiconductor switch (such as an N-channel MOSFET (NMOS)). The switching element M5 is connected between the branch node NP13 on the electrical path H5 (i.e., downstream of the second capacitor C22) and the ground node, and selectively connects or disconnects the branch node NP13 to/from the ground node under the control of the switch control unit 4. The electrical path H5 is an electrical path to which the buffer unit 14 is connected. The control electrode of the switching element M5 is connected to the monitor circuit 26. The monitor circuit 26 controls the on and off states of the switching element M5 based on the voltage at the branch node NP13 (i.e., the charge voltage of the second capacitor C22).

When the voltage detected by the monitor circuit 26 at the branch node NP13 (i.e., the charge voltage of the second capacitor C22) is less than the first charge voltage, the switch control unit 4 controls the switching element M5 to off state, thereby deactivating the discharge circuit 25. Thus, the electric charges stored in the second capacitor C22 are not discharged. On the other hand, when the voltage detected by the monitor circuit 26 at the branch node NP13 is equal to or greater than the first charge voltage, the switch control unit 4 controls the switching element M5 to on state, thereby activating the discharge circuit 25. This causes the electric charges stored in the second capacitor C22 to be discharged to the ground node via the Zener diode ZD2, the switching element M5, and the resistor R4. As a result, the charge voltage of the second capacitor C22 is lowered to, and maintained at, the Zener voltage of the Zener diode ZD2 (i.e., the second charge voltage). This reduces the chances of the charge voltage of the second capacitor C22 increasing to a level equal to or greater than the first charge voltage.

As can be seen from the foregoing description, according to the second embodiment, the constant-current source 12 is divided into the first constant-current circuit 12A (e.g., a constant-current circuit with the lower breakdown voltage) and the second constant-current circuit 12B (e.g., a constant-current circuit with the higher breakdown voltage). This necessitates division of the buffer unit 14 into the first capacitor C21 (i.e., a capacitor with the lower breakdown voltage and larger capacitance) and the second capacitor C22 (i.e., a capacitor with the higher breakdown voltage and smaller capacitance), thus reducing the size of the buffer unit 14. This division is advantageous because the constant-current source 12 commonly used to turn the load on and off i.e., for both the higher breakdown voltage and the lower breakdown voltage, requires the buffer unit 14 to have the higher breakdown voltage and larger capacitance, and therefore, an increased overall size. Thus, dividing the constant-current source 12 into the first constant-current circuit 12A and the second constant-current circuit 12B and also dividing the buffer unit 14 into the first capacitor C21 and the second capacitor C22 as described above allows the buffer unit 14 to have a reduced size.

In addition, the second embodiment described above allows the output voltage V2 of the constant-voltage source 11 to be switched between the first voltage value and the second voltage value depending on whether the switching unit 2 is operating or not. This allows the output voltage V2 of the constant-voltage source 11 to be controlled at a constant voltage value with good stability depending on whether the switching unit 2 is operating or not.

Furthermore, the load controller 1 according to the second embodiment described above includes the discharge circuit 25, thus reducing the chances of the charge voltage of the buffer unit 14 exceeding the first charge voltage. As the charge voltage of the buffer unit 14 rises, the output current I3 of the constant-current source 12 decreases, and the impedance as viewed from the load Q1 varies, which would have a negative impact on the amount of current consumed by the load Q1. Therefore, reducing the chances of the charge voltage of the buffer unit 14 exceeding the first charge voltage contributes to reducing the variation in impedance, and eventually reducing the chances of the load Q1 operating erroneously due to the variation in impedance.

Variation of Second Embodiment

Figure 3:
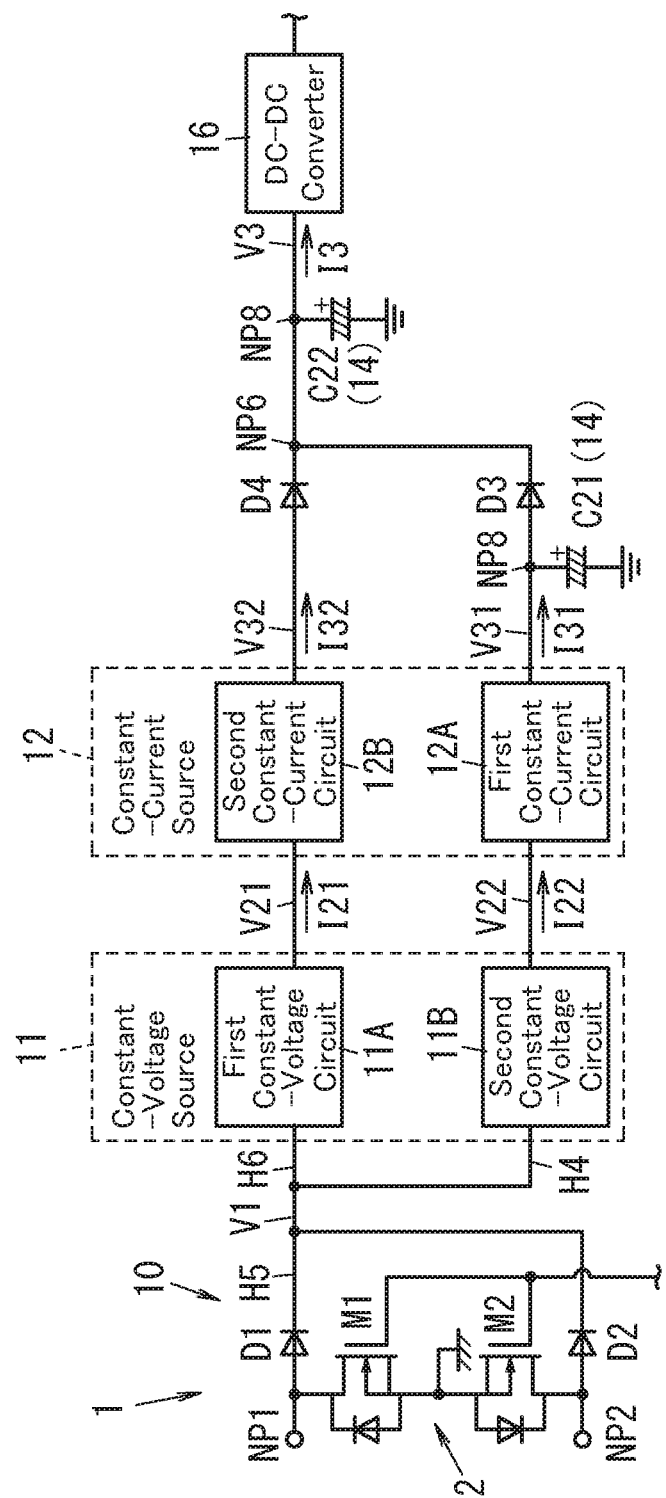
FIG. 3 is a block diagram schematically illustrating a configuration for a load controller according to a variation of the second exemplary embodiment.

In the second embodiment described above, the two constant-voltage circuits of the constant-voltage source 11 are not provided separately for the two electrical paths H4 and H6. However, this is only an example and should not be construed as limiting. Alternatively, the two constant-voltage circuits of the constant-voltage source 11, as well as the two constant-current circuits of the constant-current source 12, may also be provided separately for the two electrical paths H4 and H6, respectively, as shown in FIG. 3.

In that case, the first constant-voltage circuit 11A may be provided for the electrical path H6 and the second constant-voltage circuit 11B may be provided for the electrical path H4. Then, the second constant-voltage circuit 11B, as well as the first constant-voltage circuit 11A, is implemented as a linear power source or a series power source, for example. The first constant-voltage circuit 11A receives the output voltage V1 of the rectifier circuit 10 and delivers an output voltage V21 with its voltage value maintained at the first voltage value (which may be 80 V, for example). The second constant-voltage circuit 11B receives the output voltage V1 of the rectifier circuit 10 and delivers an output voltage V22 with its voltage value maintained at the second voltage value (which may be 15 V, for example).

Also, in that case, the first constant-current circuit 12A receives the output current I22 of the second constant-voltage circuit 11B and supplies an output current I31 with its current value maintained at the first current value (which may be 0.5 mA, for example). The second constant-current circuit 12B receives the output current I21 of the first constant-voltage circuit 11A and supplies an output current I32 with its current value maintained at the second current value (which may be 3.0 mA, for example). The output voltage V31 of the first constant-current circuit 12A may have an upper limit value of 30 V, for example. The output voltage V32 of the second constant-current circuit 12B may have an upper limit value of 55 V, for example.

Furthermore, in that case, the rectifying element D4 is connected, on the electrical path H6, between the output terminal of the second constant-current circuit 12B and the branch node NP6, and forward-biased.

In this variation, when the load Q1 is in off state (i.e., when the switching unit 2 is not operating), a DC voltage V1 with a relatively high voltage value (of 144 V, for example) is supplied from the rectifier circuit 10 to the first constant-voltage circuit 11A and the second constant-voltage circuit 11B. Then, the first constant-voltage circuit 11A delivers an output voltage V21 with a first voltage value (which may be 80 V, for example) and the second constant-current circuit 12B supplies an output current I32 with a second current value (which may be 0.5 mA, for example) and an output voltage V32 with a second clamping voltage value (which may be 55 V, for example). On the other hand, the second constant-voltage circuit 11B delivers an output voltage V22 with a second voltage value (which may be 15 V, for example) and the first constant-current circuit 12A supplies an output current I31 with a first current value (which may be 3.0 mA, for example) and an output voltage V31 with a first clamping voltage value (which may be 30 V, for example). In this case, the output voltage V32 (with the second clamping voltage value) of the second constant-current circuit 12B is higher than the output voltage V31 (with the first clamping voltage value) of the first constant-current circuit 12A, thus making the rectifying element D4 electrically conductive while keeping the other rectifying element D3 electrically unconductive. That is to say, a current flows selectively through the second constant-current circuit 12B, out of the first constant-current circuit 12A and the second constant-current circuit 12B. As a result, the output current (with the second current value of 0.5 mA, for example) of the second constant-current circuit 12B is selectively supplied as output current I3 of the constant-current source 12. Also, the second capacitor C22, out of the first capacitor C21 and the second capacitor C22, is selectively charged with the output voltage V32 (i.e., the relatively high voltage) of the second constant-current circuit 12B.

On the other hand, when the load Q1 is in on state (i.e., when the switching unit 2 is operating), a DC voltage V1 with a relatively low voltage value (of 20 V, for example) is supplied from the rectifier circuit 10 to the first constant-voltage circuit 11A and the second constant-voltage circuit 11B. In this case, since the voltage value of the DC voltage V1 (which may be 15 V, for example) is lower than the first voltage value (which may be 80 V, for example). the first constant-voltage circuit 11A delivers an output voltage V21, of which the voltage value is equal to the relatively low voltage value (of 15 V, for example), and the second constant-current circuit 12B supplies an output current I32 with a second current value (which may be 0.5 mA, for example) and an output voltage V32 corresponding to the output current I32. On the other hand, the second constant-voltage circuit 11B delivers an output voltage V22 with a second voltage value (which may be 15 V, for example) and the first constant-current circuit 12A supplies an output current I31 with a first current value (which may be 3.0 mA, for example) and an output voltage V31 corresponding to the output current I31. In this case, the output current I31 (with the first current value of 3.0 mA, for example) of the first constant-current circuit 12A is larger than the output current I32 (with the second current value of 0.5 mA, for example) of the second constant-current circuit 12B. Therefore, the output voltage V31 of the first constant-current circuit 12A is higher than the output voltage V32 of the second constant-current circuit 12B, thus making the rectifying element D3 electrically conductive while keeping the other rectifying element D4 electrically unconductive. That is to say, a current flows selectively through the first constant-current circuit 12A, out of the first constant-current circuit 12A and the second constant-current circuit 12B. As a result, the output current (with the first current value of 3.0 mA, for example) of the first constant-current circuit 12A is selectively supplied as the output current I3 of the constant-current source 12. Also, the first capacitor C21 and the second capacitor C22 are charged with the output voltage V31 (i.e., the relatively low voltage) of the first constant-current circuit 12A.

In the second embodiment described above, the rectifying element D4 is connected between the branch nodes NP6 and NP8. Thus, when the load Q1 is in on state (i.e., when the switching unit 2 is operating), a current flows through both of the first constant-current circuit 12A and the second constant-current circuit 12B. As a result, a current, of which the amount is the sum of the output current I31 of the first constant-current circuit 12A and the output current I32 of the second constant-current circuit 12B, is supplied as the output current I3 of the constant-current source 12. In this variation, on the other hand, the rectifying element D4 is connected between the output terminal of the second constant-current circuit 12B and the branch node NP6. Thus, when the load Q1 is in on state (i.e., when the switching unit 2 is operating), a current flows selectively through the first constant-current circuit 12A. Consequently, the output current I31 of the first constant-current circuit 12A is selectively supplied as the output current I3 of the constant-current source 12.

Optionally, the first and second embodiments and respective variations thereof may be implemented in combination as appropriate.

(Resume)

A load controller (1) according to a first aspect of the present disclosure includes a switching unit (2), a power source unit (6), and a control unit (4). The switching unit (2) is configured to control supply of power from an AC power supply (B1) to a load (Q1), and thereby to turn the load (Q1) on or off, by selectively connecting or disconnecting the load (Q1) to/from the AC power supply (B1). The power source unit (6) is configured to convert the AC power supplied from the AC power supply (B1) into DC power. The control unit (4) is configured to operate with the DC power supplied from the power source unit (6) and control the switching unit (2). The power source unit (6) includes a constant-voltage source (11) and a constant-current source (12). The constant-voltage source (11) is configured to keep a DC voltage to be output to the control unit (4) a constant voltage. The constant-current source (12) is configured to keep a DC current to be supplied via the constant-voltage source (11) to the control unit (4) a constant current.

This configuration allows the constant-current source (12) to keep the output current (I4) of the power source unit (6) constant. This reduces the negative impact of any variation in the amount of current consumed by a circuit for controlling the load (Q1) (such as the control unit (4)) on the operation of the load (Q1), thus reducing the chances of the variation in the amount of current consumed by the circuit for controlling the load (Q1) causing the load (1) to operate erroneously.

A load controller (1) according to a second aspect, which may be implemented in conjunction with the first aspect, further includes an additional functional unit (such as a wireless communications unit (5)). The additional functional unit is configured to behave differently from the control unit (4) and operate with the DC power supplied from the power source unit (6).

This configuration reduces, even when the load controller (1) includes not only the control unit (4) but also an additional functional unit, the negative impact of any variation in the amount of current consumed by the additional functional unit on the operation of the load (Q1), thus reducing the chances of the variation in the amount of current consumed by the additional functional unit causing the load (Q1) to operate erroneously.

In a load controller (1) according to a third aspect, which may be implemented in conjunction with the first or second aspect, the power source unit (6) further includes a buffer unit (14). The buffer unit (14) is configured to be charged with the DC current (13), supplied from the constant-current source (12), so as to readily discharge electric charges stored in the buffer unit (14).

This configuration allows the shortage of the output current (I3) of the constant-current source (12) to be compensated for by the current discharged from the buffer unit (14). This relieves the shortage of the output current (I3) of the constant-current source (12).

In a load controller (1) according to a fourth aspect, which may be implemented in conjunction with any one of the first to third aspects, the power source unit (6) further includes a step-down transformer (16). The step-down transformer (16) is configured to step down an output voltage (V3) of the constant-current source (12) and output the voltage thus stepped down to the control unit (4).

This configuration allows, when the load controller (1) includes the step-down transformer (16), the constant-current source (12) to be connected on a stage preceding the step-down transformer (16) (i.e., on a high voltage end), not on a stage following the step-down transformer (16) (i.e., on a low voltage end). This cuts down the power loss caused by an internal resistance of the constant-current source (12).

In a load controller (1) according to a fifth aspect, which may be implemented in conjunction with the third or fourth aspect, the constant-current source (12) includes a first constant-current circuit (12A) and a second constant-current circuit (12B). The buffer unit (14) includes a first capacitor (C21) and a second capacitor (C22). The first capacitor (C21) is configured to be charged with an output current (I31) of the first constant-current circuit (12A) so as to readily discharge electric charges stored in the first capacitor (C21). The second capacitor (C22) is configured to be charged with an output current (I32) of the second constant-current circuit (12B) so as to readily discharge electric charges stored in the second capacitor (C22). The first capacitor (C21) has a lower breakdown voltage than the second capacitor (C22). The first capacitor (C21) has larger capacitance than the second capacitor (C22). When the load (Q1) is in off state, the output current (I2) of the constant-voltage source (11) flows selectively through the second constant-current circuit (12B), out of the first constant-current circuit (12A) and the second constant-current circuit (12B), and the second capacitor (C22) is selectively charged, out of the first capacitor (C21) and the second capacitor (C22). When the load (Q1) is in on state, at least the output current (I31) of the first constant-current circuit (12A) flows, out of the first constant-current circuit (12A) and the second constant-current circuit (12B), and at least the first capacitor (C21) is charged, out of the first capacitor (C21) and the second capacitor (C22).

According to this configuration, the constant-current source (12) is divided into a first constant-current circuit (12A) (such as a constant-current circuit with the lower breakdown voltage) and a second constant-current circuit (12B) (such as a constant-current circuit with the higher breakdown voltage). This necessitates division of the buffer unit (14) into a first capacitor (C21) (i.e., a capacitor with the lower breakdown voltage and larger capacitance) and a second capacitor (C22) (i.e., a capacitor with the higher breakdown voltage and smaller capacitance). This allows the buffer unit (14) to have a reduced size. This division is advantageous because a constant-current source (12) commonly used to turn the load on and off (i.e., for both the lower breakdown voltage and the higher breakdown voltage) requires the buffer unit (14) to have the higher breakdown voltage and larger capacitance, and therefore, an increased overall size. Thus, dividing the constant-current source (12) into the first constant-current circuit (12A) and the second constant-current circuit (12B) and also dividing the buffer unit (14) into the first capacitor (C21) and the second capacitor (C22) allows the buffer unit (14) to have a reduced size.

In a load controller (1) according to a sixth aspect, which may be implemented in conjunction with the fifth aspect, the constant-voltage source (11) includes a first constant-voltage circuit (11A) and a second constant-voltage circuit (11B). The first constant-voltage circuit (11A) is configured to deliver an output voltage (V21) having a first voltage value. The second constant-voltage circuit (11B) is configured to deliver an output voltage (V22) having a second voltage value that is lower than the first voltage value. When the load (Q1) is in off state, the output voltage (V21) of the first constant-voltage circuit (11A) is delivered as the output voltage (V2) of the constant-voltage source (11). When the load (Q1) is in on state, the output voltage (V22) of the second constant-voltage circuit (11B) is delivered as the output voltage (V2) of the constant-voltage source (11).

This configuration allows the output voltage (V2) of the constant-voltage source (11) to be changed from the first voltage value into the second voltage value, and vice versa, depending on whether the load (Q1) is on or off. This allows the output voltage (V2) of the constant-voltage source (11) to be controlled at a constant voltage value with good stability depending on whether the switching unit (2) is operating or not.

A load controller (1) according to a seventh aspect, which may be implemented in conjunction with any one of the first to sixth aspects, further includes a detector circuit (26) and a discharge circuit (25). The detector circuit (26) is configured to detect a charge voltage of the buffer unit (14). The discharge circuit (25) is configured to readily discharge electric charges stored in the buffer unit (14). The discharge circuit (25) includes a switching element (M5). The switching element (M5) is configured to electrically connect or disconnect, on an electrical path (H5) to which the buffer unit (14) is connected, a node (NP13) downstream of the buffer unit (14) to/from a ground node.

The control unit (4) is configured to, when finding the voltage detected by the detector circuit (26) less than a threshold voltage (first charge voltage), control the switching element (M5) so as to electrically disconnect the electrical path (H5) from the ground node, and also configured to, when finding the voltage detected by the detector circuit (26) equal to or greater than the threshold voltage, control the switching element (M5) so as to electrically connect the electrical path (H5) to the ground node and thereby discharge the electric charges stored in the buffer unit (14) to the ground node.

According to this configuration, when the charge voltage of the buffer unit (14) becomes equal to or greater than the threshold voltage, the electric charges stored in the buffer unit (14) are discharged, thus reducing the chances of the charge voltage of the buffer unit (14) exceeding the threshold voltage. As the charge voltage of the buffer unit (14) rises, the output current (I3) of the constant-current source (12) decreases, and the impedance as viewed from the load (Q1) varies, which would have a negative impact on the current consumed by the load (Q1). Therefore, reducing the chances of the charge voltage of the buffer unit (14) exceeding the threshold voltage contributes to reducing the variation in impedance, and eventually reducing the chances of the load (Q1) operating erroneously due to the impedance variation.

The invention claimed is:

1. A load controller comprising:
   a switching unit configured to control supply of power from an AC power supply to a load, and thereby turn the load on or off, by selectively connecting or disconnecting the load to/from the AC power supply;
   a power source unit configured to convert AC power supplied from the AC power supply into DC power; and
   a control unit configured to operate with the DC power supplied from the power source unit and control the switching unit,
   the power source unit including:
   a constant-voltage source configured to keep a DC voltage to be output to the control unit a constant voltage, wherein the DC voltage is used to power the control unit; and
   a constant-current source configured to keep a DC current to be supplied via the constant-voltage source to the control unit a constant current, wherein the DC current is used to power the control unit without the DC current being supplied to the load.

2. The load controller of claim 1, further comprising an additional functional unit configured to behave differently from the control unit and operate with the DC power supplied from the power source unit.

3. The load controller of claim 2, wherein
   the power source unit further includes a buffer unit configured to be charged with the DC current, supplied from the constant-current source, so as to readily discharge electric charges stored in the buffer unit.

4. The load controller of claim 3, wherein
   the power source unit further includes a step-down transformer configured to step down an output voltage of the constant-current source and output the voltage thus stepped down to the control unit.

5. The load controller of claim 2, wherein
   the power source unit further includes a step-down transformer configured to step down an output voltage of the constant-current source and output the voltage thus stepped down to the control unit.

6. The load controller of claim 1, wherein
   the power source unit further includes a buffer unit configured to be charged with the DC current, supplied from the constant-current source, so as to readily discharge electric charges stored in the buffer unit.

7. The load controller of claim 6, wherein
   the power source unit further includes a step-down transformer configured to step down an output voltage of the constant-current source and output the voltage thus stepped down to the control unit.

8. The load controller of claim 1, wherein
   the power source unit further includes a step-down transformer configured to step down an output voltage of the constant-current source and output the voltage thus stepped down to the control unit.

9. A load controller comprising:
   a switching unit configured to control supply of power from an AC power supply to a load, and thereby turn the load on or off, by selectively connecting or disconnecting the load to/from the AC power supply;
   a power source unit configured to convert AC power supplied from the AC power supply into DC power; and
   a control unit configured to operate with the DC power supplied from the power source unit and control the switching unit,
   the power source unit including:
   a constant-voltage source configured to keep a DC voltage to be output to the control unit a constant voltage; and
   a constant-current source configured to keep a DC current to be supplied via the constant-voltage source to the control unit a constant current, wherein
   the power source unit further includes a buffer unit configured to be charged with the DC current, supplied from the constant-current source, so as to readily discharge electric charges stored in the buffer unit, the constant-current source includes a first constant-current circuit and a second constant-current circuit, the buffer unit includes:

a first capacitor configured to be charged with an output current of the first constant-current circuit so as to readily discharge electric charges stored in the first capacitor; and a second capacitor configured to be charged with an output current of the second constant-current circuit so as to readily discharge electric charges stored in the second capacitor, the first capacitor has a lower breakdown voltage than the second capacitor, the first capacitor has larger capacitance than the second capacitor, when the load is in off state, the output current of the constant-voltage source flows selectively through the second constant-current circuit, out of the first constant-current circuit and the second constant-current circuit, and the second capacitor is selectively charged out of the first capacitor and the second capacitor, and when load is in on state, at least the output current of the first constant-current circuit flows, out of the first constant-current circuit and the second constant-current circuit, and at least the first capacitor is charged, out of the first capacitor and the second capacitor.

10. The load controller of claim 9, wherein the power source unit further includes a step-down transformer configured to step down an output voltage of the constant-current source and output the voltage thus stepped down to the control unit.

11. The load controller of claim 10, further comprising an additional functional unit configured to behave differently from the control unit and operate with the DC power supplied from the power source unit.

12. The load controller of claim 9, wherein the constant-voltage source includes:

a first constant-voltage circuit configured to deliver an output voltage having a first voltage value; and a second constant-voltage circuit configured to deliver an output voltage having a second voltage value that is lower than the first voltage value, when the load is in off state, the output voltage of the first constant-voltage circuit is delivered as an output voltage of the constant-voltage source, and when load is in on state, the output voltage of the second constant-voltage circuit is delivered as the output voltage of the constant-voltage source.

13. The load controller of claim 9, further comprising an additional functional unit configured to behave differently from the control unit and operate with the DC power supplied from the power source unit.

14. A load controller comprising:

a switching unit configured to control supply of power from an AC power supply to a load, and thereby turn the load on or off, by selectively connecting or disconnecting the load to/from the AC power supply;

a power source unit configured to convert AC power supplied from the AC power supply into DC power; and a control unit configured to operate with the DC power supplied from the power source unit and control the switching unit, the power source unit including:

a constant-voltage source configured to keep a DC voltage to be output to the control unit a constant voltage; and a constant-current source configured to keep a DC current to be supplied via the constant-voltage source to the control unit a constant current, wherein the load controller further comprising:

a detector circuit configured to detect a charge voltage of the buffer unit; and a discharge circuit configured to readily discharge electric charges stored in the buffer unit, the discharge circuit includes a switching element configured to electrically connect or disconnect, on an electrical path to which the buffer unit is connected, a node downstream of the buffer unit to/from a ground node, and the control unit is configured to, when finding the voltage detected by the detector circuit less than a threshold voltage, control the switching element so as to electrically disconnect the electrical path from the ground node, and also configured to, when finding the voltage detected by the detector circuit equal to or greater than the threshold voltage, control the switching element so as to electrically connect the electrical path to the ground node and thereby discharge the electric charges stored in the buffer unit to the ground node.

* * * * *